United States Patent
Rop (10) Patent No.: US 8,863,493 B2
(45) Date of Patent: Oct. 21, 2014

(54) SOLAR POWER PLANT WITH INTEGRATED GAS TURBINE

(75) Inventor: Peter Simon Rop, Zoetermeer (NL)

(73) Assignee: NEM Energy B.V., BN 's Gravenhage (NL)

( * ) Notice: Subject to any disclaimer, the term of this patent is extended or adjusted under 35 U.S.C. 154(b) by 234 days.

(21) Appl. No.: 13/514,088

(22) PCT Filed: Dec. 14, 2010

(86) PCT No.: PCT/NL2010/050846
§ 371 (c)(1),
(2), (4) Date: Jun. 13, 2012

(87) PCT Pub. No.: WO2011/074952
PCT Pub. Date: Jun. 23, 2011

(65) Prior Publication Data
US 2012/0242090 A1  Sep. 27, 2012

Related U.S. Application Data

(60) Provisional application No. 61/286,481, filed on Dec. 15, 2009.

(30) Foreign Application Priority Data

Dec. 15, 2009  (NL) .................................... 2003954

(51) Int. Cl.
| | | |
|---|---|---|
| *F02C 6/00* | (2006.01) | |
| *B60K 16/00* | (2006.01) | |
| *F02C 1/05* | (2006.01) | |
| *F22B 1/00* | (2006.01) | |
| *F03G 6/06* | (2006.01) | |
| *F01K 7/16* | (2006.01) | |

(52) U.S. Cl.
CPC . *F03G 6/064* (2013.01); *F02C 1/05* (2013.01); *F22B 1/006* (2013.01); *F03G 6/067* (2013.01); *F01K 7/16* (2013.01); *Y02E 10/46* (2013.01)
USPC ............ 60/39.182; 60/641.8; 60/655; 60/676

(58) Field of Classification Search
CPC ............... F01K 7/02; F01K 7/04; F01K 7/22; F01K 7/24; F01K 7/34; F01K 7/40; F01K 23/10; Y02E 10/44; Y02E 10/46; F03G 6/065; F02C 1/05; F02C 1/10; F22B 1/006
USPC ........................... 60/641.8–641.15, 655, 676
See application file for complete search history.

(56) References Cited

U.S. PATENT DOCUMENTS 4,167,856 A * 9/1979 Seidel et al. ............... 60/641.14
5,444,972 A * 8/1995 Moore ....................... 60/39.182
(Continued)

FOREIGN PATENT DOCUMENTS

| DE | 19651645 A1 | 6/1998 |
| DE | 10144841 C1 | 10/2002 |
| EP | 2037192 A1 | 3/2009 |

OTHER PUBLICATIONS

Machine (English) Translation of DE 10144841 C1.
(Continued)

*Primary Examiner* — Hoang Nguyen (57) ABSTRACT

A hybrid solar power plant includes a first circuit including a first flow medium and a second circuit including a second flow medium. The first circuit includes at least one solar collector to transfer collected solar heat to the first flow medium. The first circuit includes at least one first fluid/second fluid heat exchanger to exchange heat from the first flow medium in the first circuit to the second flow medium in the second circuit. The second circuit is preferably a water/steam circuit. The second circuit includes at least one steam turbine for generating electricity out of steam. The first circuit further includes a heat source for generating a flow of heating gas. The heat source serves as the auxiliary energy. A gas/first fluid heat exchanger is provided for transferring heat from the flow of heating gas to the first flow medium in the first circuit.

16 Claims, 4 Drawing Sheets

(56) References Cited

U.S. PATENT DOCUMENTS 5,806,317 A * 9/1998 Kohler et al. .................. 60/659
6,141,949 A   11/2000 Steinmann
7,640,746 B2 * 1/2010 Skowronski et al. ........ 60/641.8
8,327,641 B2 * 12/2012 Freund et al. ................ 60/641.8
8,468,827 B2 * 6/2013 Ota ............................ 60/641.8
2003/0074901 A1  4/2003 Bellac et al.

OTHER PUBLICATIONS

Machine (English) Translation of DE 19651645 A1.

* cited by examiner

SOLAR POWER PLANT WITH INTEGRATED GAS TURBINE

CROSS-REFERENCE TO RELATED APPLICATIONS

This application is the National Stage of International Application No. PCT/NL2010/050846, filed Dec. 14, 2010, which claims the benefit of Netherlands Application No. 2003954, filed Dec. 15, 2009, and U.S. Provisional Application No. 61/286,481, filed Dec. 15, 2009, the contents of all of which are incorporated by reference herein.

FIELD OF THE INVENTION

The invention relates to a solar power plant, in particular a hybrid solar power plant. The solar power plant comprises a first circuit for a first flow medium and a second circuit for a second flow medium. Generally, the first circuit is a heat transfer fluid (HTF) circuit, wherein the first flow medium is an HTF flow medium like a thermal oil. The second circuit is generally a water/steam circuit, wherein the second flow medium comprises a water/steam flow medium.

BACKGROUND OF THE INVENTION

Figure 1:
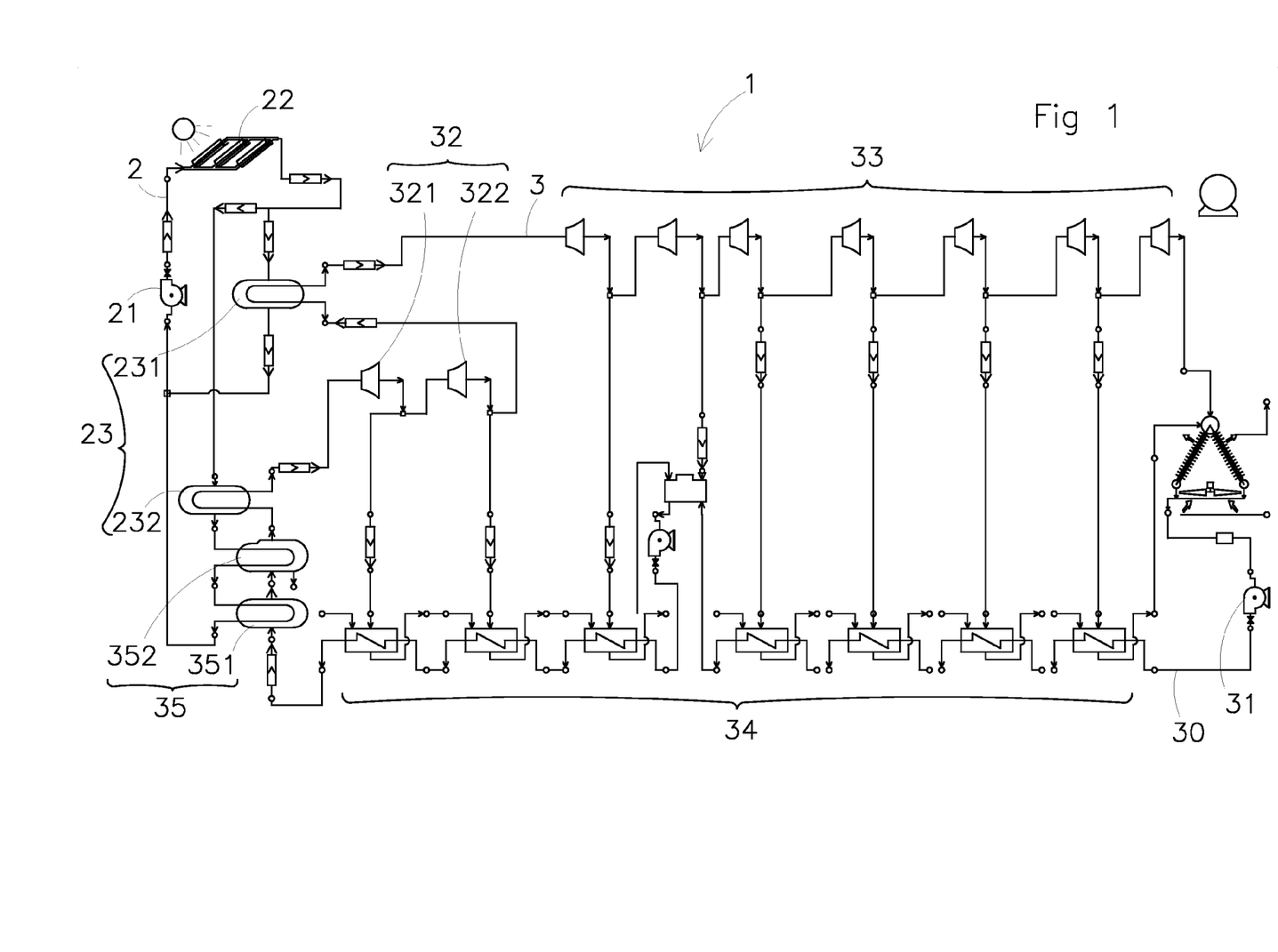
FIG. 1 shows a schematic view of a solar power plant having a first and second circuit as known in the prior art.

In practise such a solar power plant is known. FIG. 1 of this application shows in a schematic view such a conventional solar power plant. The shown configuration of the solar power plant is a practical accepted configuration which is build at a plurality of locations in the world. The solar power plant has a first and second circuit which are thermally coupled. The first circuit is a circuit for a solar heat transfer fluid, a solar HTF. The second circuit is a circuit for a mixture of water and steam.

The first circuit comprises a pump for circulating the HTF flow medium in the HTF circuit. Further, the first circuit comprises a solar field including at least one solar collector to transfer solar energy to the HTF flow medium. The HTF flow medium in the HTF circuit is heated by received solar energy. Normally, the first flow medium is an oil which is heated by the solar collector to a high temperature of at most 400° C. Care has to be taken to prevent the temperature of the flow medium to exceed above this maximum temperature of about 400° C. Above this temperature the oily HTF flow medium may rapidly deteriorate.

Heat energy of the HTF flow medium is transferred to the second flow medium by heat exchangers. The second circuit comprises a pump for circulating the second flow medium, a feed supply for supplying water, an economizer, an evaporator, a super heater, a re-heater and a steam turbine for generating electric energy out of steam. The steam turbine has nine sections, such that passing steam expands and cools down stepwise.

A drawback to the known solar power plant is the low availability. The availability of the solar power plant is dependent on many aspects. One major concern is that solar energy is only available during day time and influenced by weather conditions. No energy is generated during the night and less energy is generated during a cloudy day. Typically, the overall efficiency of the known solar power plant is about 35%.

EP 2.037.192 discloses a first steam circuit comprising a steam turbine and a gas turbine. Heat originating from the gas turbine is used in a waste heat recovery boiler to heat a water/steam mixture which circulates in the first steam circuit. A first steam supply piping is provided to supply steam from the waste heat recovery boiler to the steam turbine. A second steam supply piping is branched of the first steam supply piping to obtain a thermal coupling to transfer heat from a separately arranged second circuit to the first steam circuit.

The second circuit includes several heat collecting zones. The heat collecting zones are arranged in parallel and a heat transfer fluid is circulated by a pump. The second circuit comprises further a heat exchanging device to transfer heat from the second circuit to the water/steam mixture in the second steam supply piping of the first circuit.

A drawback of the disclosed configuration is that the efficiency of the total configuration is not satisfying.

DE 101 44841 discloses a steam circuit including a solar field. The steam circuit comprises a gas turbine. The gas turbine has a gas conduit to guide a flow of heating gas along several heat exchangers of the steam circuit. The gas conduit is subdivided into a first and second gas passageway. The flow of heating gas is distributed over the first and second gas passageway. The steam circuit has a water supply conduit which is branched to supply water through each gas passageway. The first and second gas passageways are each provided with respectively three heat exchangers which functions as an economiser, an evaporator and a superheater. The first gas passageway includes a solar field as an evaporator.

A first drawback of the disclosed steam circuit is that only one circuit including a water/steam mixture is provided. The water/steam mixture is supplied to the solar field which will result in a reduced efficiency. A further drawback to this known configuration is that the subdivided gas conduit provides constructional problems to build and operate the gas conduit. Further, the configuration includes double presented heat exchangers which increases costs to build the installation.

DE 196.51.645 discloses a configuration which presents a combination of a gas circuit and a steam circuit. The gas circuit includes a solar field to preheat supplied gas. The preheated gas is subsequently supplied to a gas turbine to generate electricity.

The steam circuit comprises a steam turbine. A steam flow is supplied to the steam turbine to generate electricity. The steam circuit is thermally coupled to the gas circuit by a heat exchanger to transfer waste heat originating from the gas turbine to the steam flow in the steam circuit.

A first drawback of the disclosed configuration is that the efficiency is not satisfying. A further drawback is that an operation of the gas turbine is always necessary to generate electricity. The solar field is arranged to preheat a gas flow, in which subsequently a fuel is mixed. It is not disclosed how to produce purely solar energy without the need of the fuel consuming gas turbine.

It is an object of the present invention to at least partially eliminate the above mentioned drawback and/or to provide a useable alternative. In particular, it is an object of the invention to provide measures which increase the availability of a solar power plant. More in particular, it is an object to provide at least one advantageous measure for the practical and accepted configuration of the solar power plant as shown in FIG. 1. In particular the invention aims to provide a solar power plant which is able to produce electricity from purely solar energy without $CO_2$ emissions when sufficient solar energy is available during daylight.

SUMMARY OF THE INVENTION

This object is achieved by a solar power plant according to the present invention.

The solar power plant according to the invention is a hybrid solar power plant which means that besides the solar energy source an auxiliary energy source is available. The auxiliary energy source may for example be a gas turbine. The solar power plant comprises a first circuit including a first flow medium and a second circuit including a second flow medium.

Preferably, the first flow medium is a heat transfer fluid (HFT), in particular a solar heat transfer fluid like a thermal oil. The solar HTF may be optimally suitable to transfer heat from received solar radiation. The first circuit comprises a pump for circulating the first flow medium in the first circuit. Further, the first circuit includes at least one solar collector, preferably a solar field of solar collectors, to transfer collected solar heat to the first flow medium. The first circuit comprises at least one first fluid/second fluid heat exchanger to exchange heat from the first flow medium in the first circuit to the second flow medium in the second circuit. Herewith, the first and second circuit are thermally coupled.

The second circuit is preferably a water/steam circuit. The second circuit comprises a feed supply and a pump for circulating the second flow medium in the second circuit. The second circuit comprises further at least one steam turbine for generating electricity out of steam.

The solar power plant according to the invention is improved in that the first circuit further comprises a heat source for generating a flow of heating gas. The heat source serves as the auxiliary energy source and gives the solar power plant a hybrid character. A gas conduit is arranged for guiding the flow of heating gas originating from the heat source. A gas/first fluid heat exchanger, in particular a gas/HTF heat exchanger, is provided for transferring heat from the flow of heating gas to the first flow medium, in particular the HTF flow medium, in the first circuit. The gas/first fluid heat exchanger extends at least partially in the gas conduit, wherein the heating gas passes the gas/first fluid heat exchanger. In operation, the first flow medium passes through the gas conduit, such that the first flow medium is directly heated by the heating gas. In stead of a solar power plant having only a heat transfer from a HTF flow medium to a water/steam mixture heat transfer, this direct heat transfer from heating gas to HTF flow medium may advantageously increase the efficiency of the hybrid solar power plant according to the invention. In some summer circumstances the solar power plant has to compensate enormous load drops in the solar field from 90% to 25% in just one hour. In particular, this direct heat transfer from heating gas to the first flow medium may improve a capability of the solar power plant to compensate quickly for reduced heat transfer in the solar field. Notwithstanding a fluctuating heating capacity of the solar field, the presence of the gas/first fluid heat exchanger according to the invention may provide a continuous operation of the solar power plant.

Additionally, the presented solution may easily be integrated in an already build solar power plant which has a configuration as shown in FIG. 1.

Advantageously, the presence of the heat source enables a hybrid operation of the solar power plant. Preferably, the heat source is a gas turbine. Herewith, the solar power plant may be operated by both solar energy and the auxiliary energy source. Due to the presence of the auxiliary energy source, the solar power plant is less dependent on solar energy alone which may result in an increased availability. Day and nighttime or cloudy weather may have less influence on the final achieved availability.

Advantageously, the gas/first fluid heat exchanger is provided in the first circuit which transfers heat from the heating gas to the first flow medium in the first circuit. The gas/first fluid heat exchanger may be arranged in fluid communication with the solar collector. The heat exchanger may be arranged in series with the solar collectors in the solar field. A first flow medium in the first circuit which passes the solar collector may be further heated by the gas/first fluid heat exchanger. This may result in a relative simple configuration of the solar power plant. The heat source and heat exchanger may be incorporated in a simple manner which allows an expedient controllability.

It may be a major advantage that during daylight and weather circumstances providing sufficient solar energy, the solar power plant may operate purely on solar energy. The operation may be free from $CO_2$ emissions. The zero emission operation of the solar power plant may be environmental friendly. During less favourable circumstances, the heat source may be used to compensate for a reduction of solar energy. Herewith, the solar power plant is flexible in its operation and may generate electricity in a reliable and environmental friendly manner.

In a particular embodiment of the solar power plant according to the invention, the gas/first fluid heat exchanger is a gas/HFT heat exchanger which transfers heat from the heating gas to a heat transfer fluid (HFT) in the first circuit, a HFT circuit. Advantageously, a high efficiency may be achieved in transferring heat from the heating gas to the heat transfer fluid.

In an embodiment according to the invention an, in particular oily, solar heat transfer fluid may be used in the first circuit. Such a HTF flow medium may be heated up to at most 400° C. to prevent early deterioration. The HTF flow medium temperature may not exceed 400° C. because of undesired deterioration of the fluid at higher temperatures.

In an embodiment of the solar power plant according to the invention, the heat source is a gas turbine. The gas turbine may have advantageously a high efficiency in transferring fossil fuels into electricity and heating gasses which may advantageously have a positive contribution to the total efficiency of the solar power plant. The gas turbine may produce during normal operation an exhaust heating gas having a temperature of about 600° C. at the outlet of the gas turbine.

In an embodiment of the solar power plant according to the invention, at least one heat exchanger including at least one heat transfer section may be arranged in the gas conduit upstream the gas flow of the gas/HFT heat exchanger. During operation, in this embodiment, an exhaust heating gas from the heat source, firstly pass the heat transfer section and subsequently pass the HFT heat exchanger. The heat transfer section is preferably arranged in the second circuit. The heat transfer section may be in fluid communication with the steam turbine of the second circuit. Before reaching the HFT heat exchanger, the heating gas will cool down while passing the heat transfer section. Heat from the passing heating gasses may be transferred to the second flow medium of the second circuit. This may heat up the second flow medium up to a temperature of about 600° C. which may be an inlet temperature for the steam turbine. Advantageously, heat from the cooled down heating gas is may be used to finally generate electricity. The presence of the heat transfer section in addition to the gas/HFT heat exchanger may enable a stepwise heating of the second flow medium. The second flow medium may be heated up to a temperature of about 400° C. by heat transfer from the first circuit and subsequently in a next step to a temperature of about 600° C. by heat transfer from the heating gasses to the second circuit. The steam turbine may be configured to process steam at an inlet temperature of at most 600° C., in particular at most 565° C. Herewith, the steam turbines may operate advantageously at the relatively high temperature of about 600° C. which may increase the total efficiency of the operation of the solar power plant.

Advantageously, the configuration of the solar power plant still enables an operation purely on solar energy. In a pure solar operation, the temperature of the second flow medium will remain at about 400° C. The pure solar operation may be free from CO2 emissions which will contribute to the reduction of the global greenhouse effect.

In an embodiment of the solar power plant according to the invention, at least two heat transfer sections define a super heater and a re-heater. The superheater may be situated in the second circuit to heat the second flow medium, in particular steam, in a first instance from a temperature of about 400° C. up to about 600° C. Subsequently, the superheated second flow medium may be supplied to the steam turbine. After passing at least one section of the steam turbine, the second flow medium may be in a second instance be re-heated by the re-heater. The second flow medium may be conducted after e.g. two sections from the steam turbine to the reheater. Eventually, the second flow medium may be conducted to the re-heater via a heat exchanger of the first circuit. After passing the reheater, the second flow medium may be conducted back to the steam turbine to pass the remaining steam turbine sections. The stepwise heating of the second flow medium by the superheater and reheater may advantageously further increase the total efficiency of the solar power plant.

In an embodiment of the solar power plant according to the invention, the superheater comprises at least two superheater sections which are situated in the gas conduit. Furthermore, the reheater may comprise at least two re-heater sections which are situated in the gas conduit. The superheater and reheater sections may be alternately situated downstream the heating gas flow in the gas conduit. Preferably, a superheater section is positioned most upstream the gas flow. At least one reheater section in the gas conduit may be arranged in between two superheater sections. This configuration, advantageously, enables a further improved heat transfer from the heating gasses to the second flow medium.

In an embodiment of the solar power plant according to the invention, the solar power plant is further provided with at least one by-pass conduit to by pass at least one heat exchanger of the second circuit. The heat exchanger of the second circuit is at least partially positioned in the gas conduit for transferring heat from the heating gas to the second flow medium and has a heat exchanger supply and discharge conduit. A heat exchanger valve is provided to open or close the heat exchanger supply and discharge conduit in dependence of a profit of the solar field and corresponding operation of the heat source. The by-pass conduit is provided with a by-pass valve to open or close the by-pass conduit during operation. The presence of the by-pass conduit allows an improved operation of the solar power plant without using the heating source. The heat exchanger may be closed and by-passed to prevent undesired cooling of the second flow medium. Advantageously, the efficiency of a pure solar operation of the solar power plant according to the invention may be further improved by the presence of at least one by-pass conduit.

Further preferred embodiments of the solar power plant according to the invention are described herein.

Further the invention relates to a method generating electricity. A hybrid solar power plant is used for generating electricity. The solar power plant includes a steam turbine, at least one solar collector and an auxiliary heat source. The method comprises the steps of circulating a first flow medium in a first circuit comprising the solar collector; circulating a second flow medium in a second circuit comprising the steam turbine; and transferring heat from the first flow medium to the second flow medium in the second circuit by at least one heat exchanger which provides a thermal connection between the first and second circuit.

The method according to the invention is characterised in that the method comprises further a step of transferring heat to the first flow medium in the first circuit by selectively one or both of the steps of transferring collected solar heat by the solar collector to the first flow medium in the first circuit and transferring heat from a heating gas originating from a heat source to the first flow medium in the first circuit by a gas/first fluid heat exchanger.

The used solar power plant provides an optional operation for both steps in combination or selectively one of the steps. During daylight, the operation for the generation of electricity may be purely based on collected solar heat. During night or weather circumstances with no or hardly no solar radiation available, the operation may be purely based on an activated auxiliary heat source. The combination of both steps is also available in the method according to the invention and may be selected during twilight or weather circumstances with insufficient solar radiation.

Further preferred embodiments are described herein.

BRIEF DESCRIPTION OF THE DRAWINGS

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

DETAILED DESCRIPTION OF THE INVENTION

FIG. 1 shows in a schematic view a conventional solar power plant 1. The shown configuration of the solar power plant is a practical accepted configuration which is build at a plurality of locations in the world. The solar power plant 1 comprises a Heat Transfer Fluid (HTF) circuit 2 as a first circuit and a water/steam circuit 3 as a second circuit including a second flow medium which is a water/steam mixture. The HTF circuit 2 is depicted at the left hand in FIG. 1 and is thermally connected to the water/steam circuit 3. The HTF circuit 2 comprises at least one solar collector 22 in a solar field to exchange solar heat to the HTF flow medium. The HTF flow medium may e.g. be thermal oil. The HTF flow medium has appropriate properties to be heated by solar radiation. The HTF circuit 2 comprises a pump 21 for circulating the HTF flow medium.

The HTF circuit 2 is thermally coupled to the water/steam circuit 3 by at least one heat exchanger 23, 35. The HTF flow medium is pumped through the solar field 22 to at least one HTF-steam heat exchanger. The illustrated embodiment of FIG. 1 comprises a first HTF-steam heat exchanger 231 and a second HTF-steam heat exchanger 232. The HTF-steam heat exchangers are in fluid communication with the solar field 22. The first and second heat exchangers 231, 232 are arranged in parallel with respect to each other and connected to the solar field 22.

The second HTF-steam heat exchanger 232 functions as a superheater to heat steam flow medium in the water/steam circuit 3 from a temperature of about 320° C. to 380° C. The superheated steam flow medium is fed to a first group of steam turbine sections 32. The steam turbine sections 321, 322 are connected in series. By arranging a plurality of steam turbine sections in a cascade, the steam temperature may be reduced step wise. While passing the at least two sections, the steam cools down to a temperature of about 230° C. Subsequently, the cooled steam from the steam turbine section 322 is conducted to the first HTF-steam heat exchanger 231 to be reheated to a temperature of about 380° C. The reheated steam flow medium is conducted to a second group of steam turbine sections 33. As illustrated, the second group of steam turbine sections 33 includes seven sections. The steam flow medium is conducted through the steam turbine sections and electricity is generated.

The HTF-circuit 2 further comprises auxiliary heat exchangers 35 for exchanging heat from the HTF flow medium to the water/steam mixture. The auxiliary heat exchanger 35 includes a first auxiliary heat exchanger 351 and a second auxiliary heat exchanger 352. The first and second auxiliary heat exchangers 351 and 352 are arranged in series and positioned downstream of the second HTF-steam heat exchanger 232. The auxiliary heat exchangers may heat the water/steam mixture stepwise from about 250° C. to about 300° C.

The water/steam circuit 3 comprises further a group of feedwater preheater stages 34. A feedwater preheater is a heat exchange unit to heat up water from a feed supply 30, which includes a pump 31. The group of feedwater preheater stages comprises seven stages which corresponds with the seven sections of the group of steam turbine sections 33. Each steam turbine section from the group 33 is connected to a corresponding stage of the feedwater preheater 34. Each feedwater preheater stage 34 has an inlet steam conduit originating from a steam turbine section.

The schematic represented solar plant has a typical electric efficiency of about 35%. The availability of the solar power plant is mainly influenced by day and night differences. During the night, the solar field 22 does not generate heat which substantially reduces the efficiency.

Figure 2:
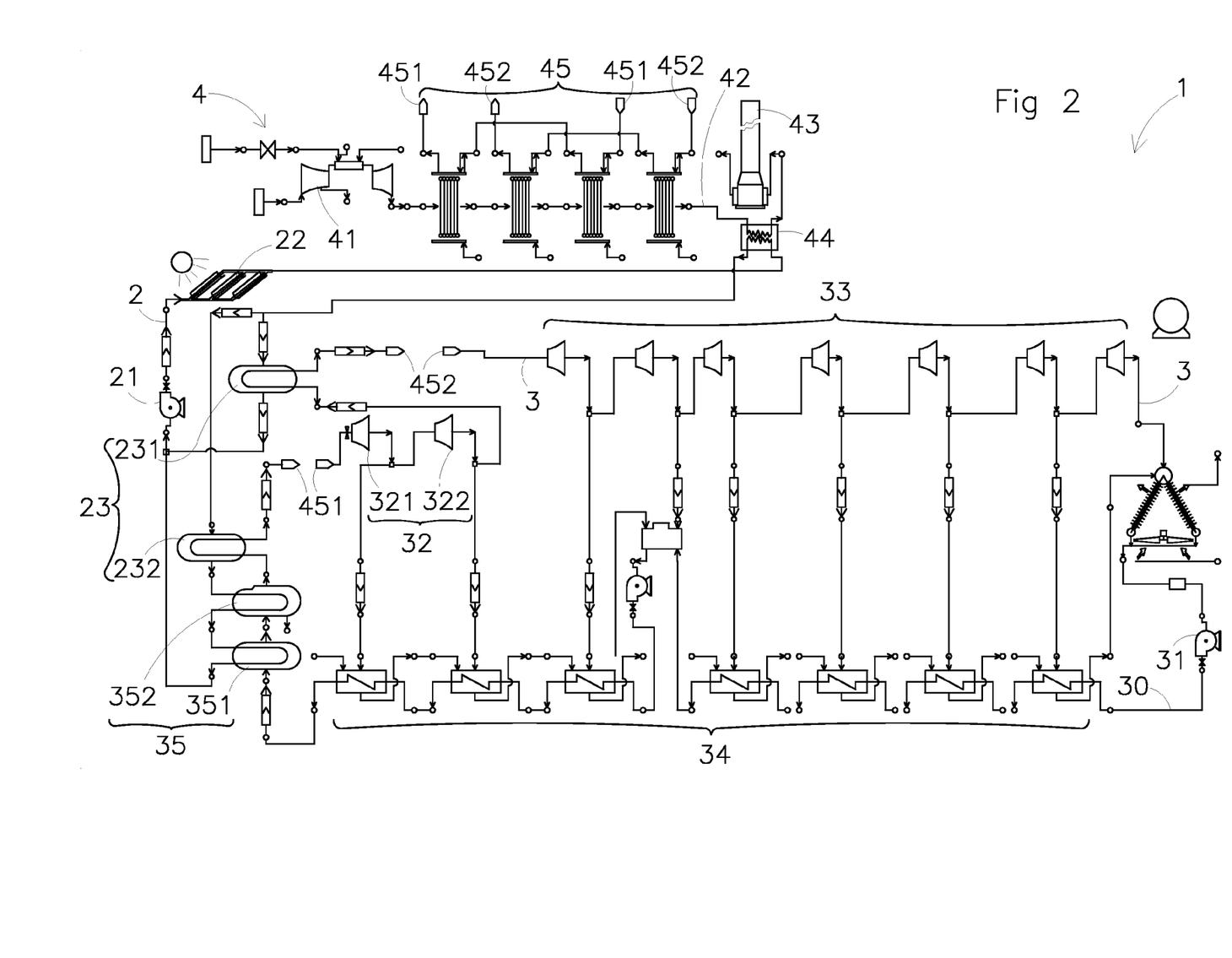
FIG. 2 shows in a schematic view a solar power plant according to the invention, wherein the solar power plant comprises a gas/HTF heat exchanger.

FIG. 2 shows in a schematic view a solar power plant according to the invention. The solar power plant has an improved availability with respect to the conventional solar power plant of FIG. 1. The solar power plant 1 according to the invention further comprises an auxiliary energy source 4. The auxiliary energy source gives the solar power plant 1 hybrid properties. The solar power plant 1 may be operated on solar energy and energy produced by fossil fuels. The hybrid solar power plant 1 is able to operate fully on solar energy or fully on fossil energy. During daylight the solar power plant 1 may produce electric energy purely generated by solar energy. During the night the solar power plant 1 may produce electric energy originating from fossil fuels. During the twilight, the solar power plant 1 may operate on both solar energy as fossil energy. If the solar power plant 1 operates on purely solar energy, the solar power plant 1 may be environmental friendly because the operation may be free from $CO_2$ emissions during the day.

The fossil energy source 4 comprises a heat source 41. As illustrated, the heat source 41 may be a gas turbine. The gas turbine is suitable for industrial application and may generate a power of 174600 kW. The gas turbine 41 has a LVH efficiency of about 36%. The gas turbine 41 may produce heating gasses. The heating gas has typically an exhaust temperature of about 600° C. at an outlet of the gas turbine. The gas turbine 41 is connected to a gas conduit 42 to guide the heating gas. The gas turbine 41 is connected at one end of the gas conduit, while at the other end a chimney 43 is provided to discharge cooled heating gas to the environment.

During operation, the heating gas passes through the gas conduit 42, wherein the heating gas passes a gas-HTF heat exchanger 44. The gas-HTF heat exchanger 44 is configured to transfer heat from the heating gas to a heat transfer fluid in a circuit. Here, the gas-HTF heat exchanger 44 provides a thermal connection in between the heat source 41 and the first circuit 2, the HTF circuit. The gas-HTF heat exchanger 44 extends at least partially into the gas conduit 42 to heat the HTF flow medium in the HTF circuit 2. The gas-HTF heat exchanger 44 is configured to heat the HTF flow medium in the HTF circuit 2 up to a temperature of about 400° C. Typically, a heat transfer fluid like thermal oil has a maximum admitted temperature of about 400° C. to prevent deterioration of the fluid. This maximum temperature of the HTF flow medium may be for example controlled by the pump 21.

The gas-HTF heat exchanger 44 is in fluid communication connected to the solar field 22. If the solar field 22 does not sufficiently heat the HTF flow medium then the gas-HTF heat exchanger 44 may be switched on to further heat the HTF flow medium. Herewith, a hybrid solar power plant is provided which may operate during day and night.

The heating gas which has passed the gas-HTF heat exchanger 44 may be discharged via the chimney 43. Typically the temperature of the heating gases after leaving the gas-HTF heat exchanger 44 is about 260° C.

As shown in the embodiment of the solar power plant 1 in FIG. 2, the water/steam circuit 3 is further extended by heat exchangers 45. The heat exchangers 45 are arranged in the gas conduit 42. The heat exchangers 45 are situated upstream the gas flow of the gas-HTF heat exchanger 44. The heat exchangers 45 include a super heater 451 and a re-heater 452. The super heater 451 comprises two super heater sections. The re-heater 452 comprises two re-heater sections. The super heater and re-heater sections are arranged in a row in the gas conduit 42. A super heater section 451 is positioned most upstream the gas flow. Subsequently two re-heater sections 452 and one further super heater section 451 are positioned downstream the gas flow of the first super heater section in an alternating manner. The gas-HTF heat exchanger 44 is positioned downstream the gas flow of the final re-heater section 452. The heat exchangers 45 provide a cooling of the heating gases to about 500° C. Heat is transferred from the heating gases to the steam flow medium in the water/steam circuit 3 by the heat exchangers 45. The heat exchangers 45 may provide an increase of the steam flow medium temperature from about 350° C. to 565° C. The water/steam circuit 3 comprises at least one group of steam turbine sections 32, 33 which is positioned downstream the steam flow medium of the heat exchangers 45. To increase the efficiency, the steam turbine is configured to operate at steam temperatures of at most 600° C., and in particular at about 565° C. during normal operation.

Figure 3:
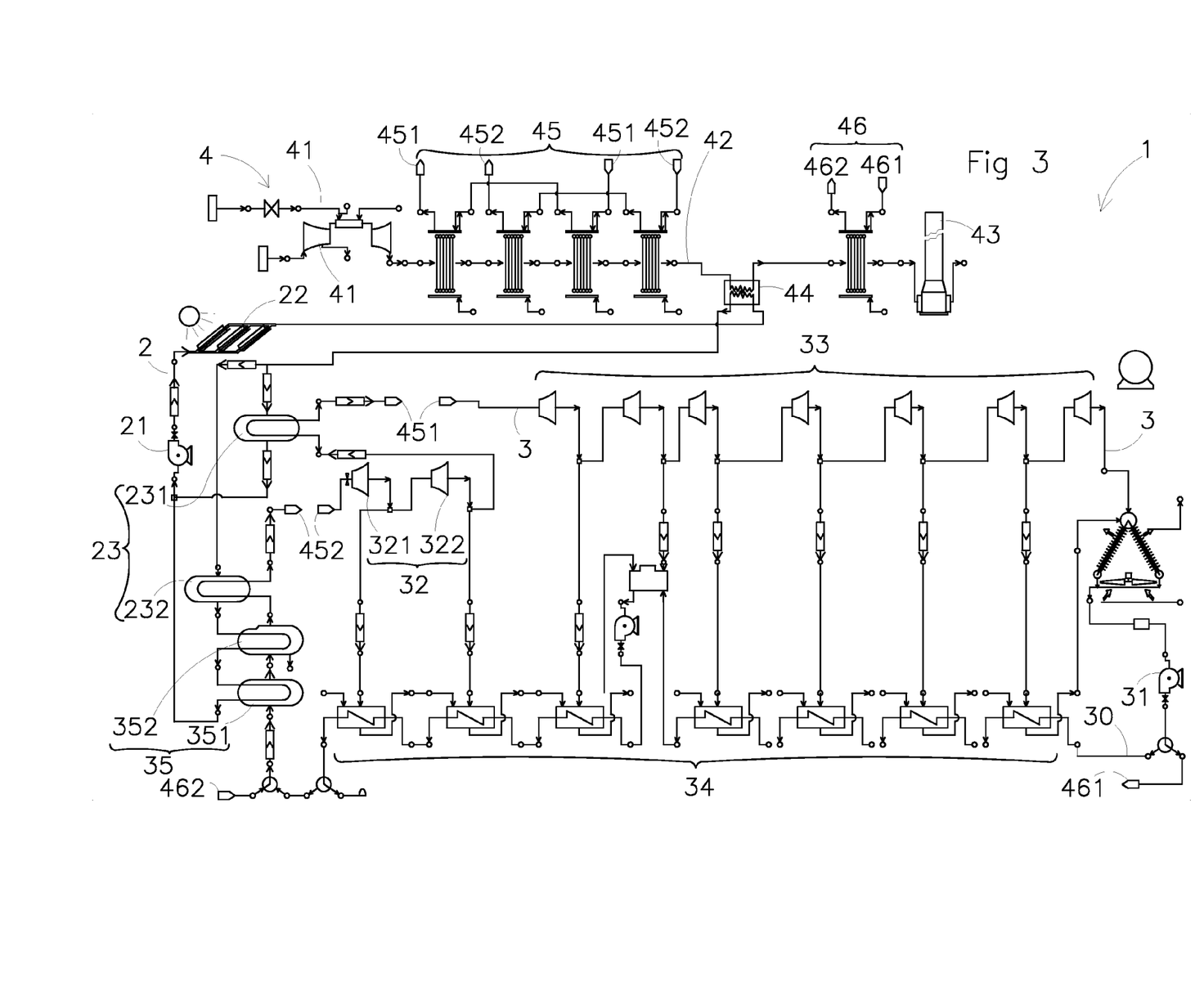
FIG. 3 shows in a schematic view the solar power plant of FIG. 2 which is further extended with heat exchange units in the second circuit.

FIG. 3 shows in a schematic view a further embodiment of the solar power plant 1 according to the invention. The shown embodiment corresponds with the embodiment of FIG. 2. Corresponding reference numbers indicate similar components. The solar power plant 1 of FIG. 3 is further extended in that the fossil energy train 4 is further provided with a heat exchanger 46. The heat exchanger 46 is arranged in the gas conduit 42 downstream of the gas-HTF heat exchanger 44. The heat exchanger 46 is implemented in the water/steam circuit 3 and is configured to transfer heat from the heating gas to the steam flow medium. The heat exchanger 46 has an inlet 461 and an outlet 462. The heat exchanger 46 functions as an economizer to preheat water originating from the feed supply 30. The heat exchanger 46 is connected in parallel with the group of economizers 34 in the water/steam circuit 3. At least one three way valve 4603 is provided in the feed supply 30 to open or close the inlet 461 or outlet 462 of the heat exchanger 46. The at least one three way valve 4603 may be positioned upstream and/or downstream the heat exchanger 46. By switching the three way valve 4603, the flow medium can be supplied to the heat exchanger 46 or in case that the heat source 4 is out of use, the heat exchanger 46 may be by-passed. Herewith, the feed supply 30 further serves as a by-pass conduit. Advantageously, the presence of the heat exchanger 46 may further increase the electric efficiency of the solar power plant 1. Due to the presence of the heat exchanger 46, the heating gasses originating from the gas-HTF heat exchanger 44 may be further cooled down, wherein thermal energy is used to heat the steam flow medium in the water/steam circuit. Herewith, the total electric efficiency of the solar power plant may be increased to about 50% wherein an exhaust temperature of the heating gas out of the gas conduit may be about 155° C. The heating gas may be discharged to the environment by a chimney 43. In comparison with the chimney 43 of FIG. 2 the chimney 43 of FIG. 3 may advantageously have smaller dimensions, because of the reduced heating gas temperatures.

Figure 4:
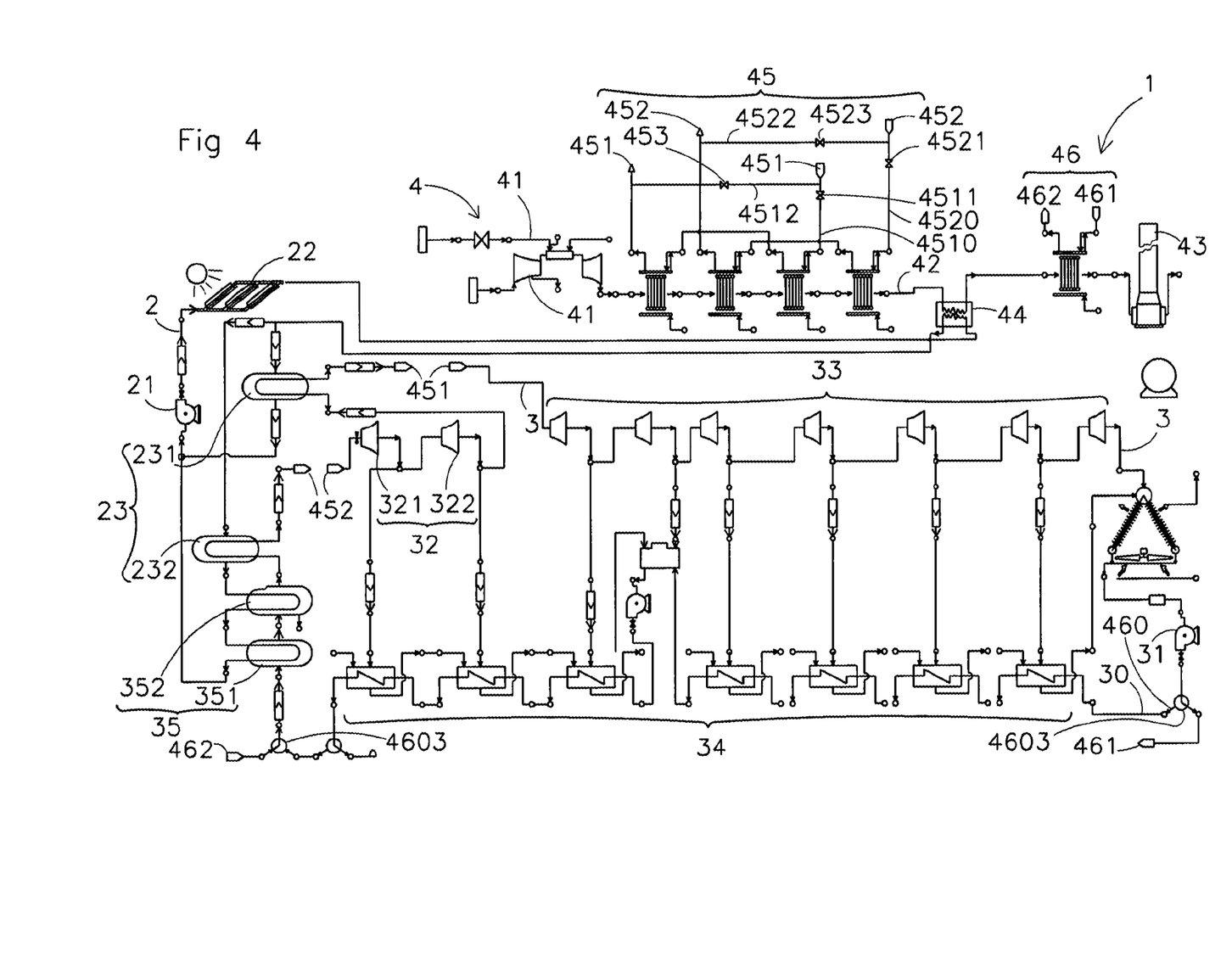
FIG. 4 shows in a schematic view the solar power plant of FIG. 3 which is further extended with by pass conduits to by pass heat exchange units in the second circuit.

FIG. 4 shows in a schematic view a further embodiment of the solar power plant 1 according to the invention. The shown embodiment corresponds with the embodiment of FIG. 3. Corresponding reference numbers indicate similar components. FIG. 4 shows the HTF circuit 2 and the water/steam circuit 3 which are thermally coupled by at least one heat exchanger 23 and/or 35. The heat exchanger 23 is positioned downstream from the solar field and the gas-HTF heat exchanger 44 in the HTF circuit. The gas-HTF heat exchanger 44 is at least partially arranged in the gas conduit 42 for a direct heat transfer from the heating gas to the HTF flow medium.

As shown in the embodiment of the solar power plant 1 in FIG. 2, the water/steam circuit 3 is further extended by heat exchangers 45. The heat exchangers 45 are arranged in the gas conduit 42. The heat exchangers 45 are situated upstream the gas flow of the gas-HTF heat exchanger 44. The heat exchangers 45 include a super heater 451 and a re-heater 452. The super heater 451 comprises two super heater sections. The re-heater 452 comprises two re-heater sections. The super heater and re-heater sections are arranged in a row in the gas conduit 42. A super heater section 451 is positioned most upstream the gas flow. Subsequently a re-heater sections 452, one further super heater section 451 and a further re-heater section 452 are positioned downstream the gas flow of the first super heater section in an alternating manner. The gas-HTF heat exchanger 44 is positioned downstream the gas flow after the final re-heater section 452.

The solar power plant as shown in FIG. 4 is further provided with at least one by-pass conduit 4512, 4522 to by pass the heat exchanger 45. The by-pass conduit 4512, 4522 is provided with a by-pass valve 4513, 4523 to open or close the by-pass conduit 4512, 4522. The heat exchanger 45 has a heat exchanger supply and discharge conduit 4510, 4520. A heat exchanger valve 4511, 4521 is provided to open or close the heat exchanger supply and discharge conduit 4510, 4520 in dependence of a profit of the solar field and corresponding operation of the heat source 4. The presence of the by-pass conduit allows an improved operation of the solar power plant without using the heating source 4. The heat exchanger 45 may be closed and by-passed to prevent undesired cooling of flow medium. Advantageously, the efficiency of a pure solar operation of the solar power plant according to the invention may be further improved by the presence of the by-pass conduits 4512 and 4522.

The by-pass conduit 4512, 4522 of heat exchanger 45 may alternatively be arranged as shown in detail for heat exchanger 46. Heat exchanger 46 has a by-pass conduit 460 which includes at least one three way valve 4603. The three way valve 4603 may be operated to supply flow medium to the heat exchanger 46 or to close the heat exchanger 46 and to let the flow medium by-pass the heat exchanger 46. The by-pass conduit 460 may correspond with the feed supply 30 of the feedwater preheater stages to by pass the heat exchanger 46.

Thus, the invention provides a solar power plant having an increased efficiency. Additionally, the invention provides a solar power plant which is able to operate purely on solar energy or in combination with an auxiliary energy source.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

The invention claimed is:

1. A solar power plant comprising respectively a first circuit which forms a solar circuit for circulating a solar flow medium and a second circuit which forms a steam circuit for circulating a second flow medium, the second flow medium being distinct from the solar flow medium,
wherein the solar circuit comprises:
a pump for circulating the solar flow medium in the first circuit;
at least one solar collector to transfer collected solar heat to the solar flow medium; and
wherein the steam circuit comprises an auxiliary energy providing system comprising:
a feed supply;
a pump for circulating the second flow medium in the second circuit; and
a steam turbine for generating electricity out of steam;
in which at least one first fluid/second fluid heat exchanger is provided to thermally couple the solar circuit and the steam circuit to exchange heat from the solar flow medium received from the at least one solar collector in the solar circuit to the second flow medium in the steam circuit;

wherein the solar circuit further comprises:
- a heat source for generating a flow of heating gas;
- a gas conduit for guiding the flow of heating gas from the heat source; and
- a gas/first fluid heat exchanger for transferring heat from the heating gas to the solar flow medium in the first solar circuit, wherein the gas/first fluid heat exchanger is at least partially arranged in the gas conduit, such that the solar flow medium is directly heated by the heating gas.

2. The solar power plant according to claim 1, wherein the heat source is a gas turbine.

3. The solar power plant according to claim 1, wherein the first solar flow medium is a solar heat transfer fluid (HTF) flow medium and wherein the gas/first fluid heat exchanger is a gas-heat transfer fluid (gas-HTF) heat exchanger.

4. The solar power plant according to claim 1, wherein the second flow medium comprises a mixture of water and steam.

5. The solar power plant according to claim 1, wherein at least one heat exchanger is arranged at least partially in the gas conduit in between the heat source and the gas/first fluid heat exchanger, and wherein the heat exchanger is in fluid communication with the second circuit for transferring heat from the heating gas to the second flow medium in the second circuit.

6. The solar power plant according to claim 5, wherein the heat exchanger comprises at least one heat transfer section which is arranged upstream the gas flow of the HTF heat exchanger.

7. The solar power plant according to claim 6, wherein the at least one heat transfer section is arranged as a super heater in the second circuit.

8. The solar power plant according to claim 6, wherein the at least one heat transfer section is arranged as a re-heater in the second circuit.

9. The solar power plant according to claim 1, wherein a super heater and/or a reheater are configured to heat the second flow medium in the second circuit up to at least 400° C. as an inlet temperature of the second flow medium to the steam turbine.

10. The solar power plant according to claim 1, wherein the steam turbine in the second circuit is configured to process steam at an inlet temperature of at most 600° C.

11. The solar power plant according to claim 5, wherein the solar power plant is further provided with at least one by-pass conduit to by-pass the at least one heat exchanger of the second circuit, wherein the heat exchanger has a heat exchanger supply and discharge conduit including at least one heat exchanger valve to open or close the heat exchanger supply and discharge conduit, wherein the by-pass conduit is in fluid communication connected to the heat exchanger supply and discharge conduit and is provided with a by-pass valve to open or close the by-pass conduit during operation.

12. The solar power plant according to claim 1, wherein the second circuit comprises a heat exchanger which is at least partially arranged in the gas conduit down stream of the gas/first fluid heat exchanger.

13. The solar power plant according to claim 12, wherein the second circuit comprises at least one feedwater preheater for heating supplied water, and wherein the heat exchanger is arranged in parallel with said feedwater preheater.

14. A method for generating electricity by a hybrid solar power plant including a steam turbine, a solar collector and an auxiliary heat source comprising the steps of:
- circulating a solar flow medium in a first circuit which forms a solar circuit comprising the solar collector;
- circulating a second flow medium in a second circuit which forms a steam circuit comprising the steam turbine, the second flow medium being distinct from the solar flow medium;
- transferring heat from the solar flow medium received from the solar collector to the second flow medium in the second circuit by at least one heat exchanger which provides a thermal connection between the first and second circuit external from the auxiliary heat source; and
- transferring heat to the solar flow medium in the solar circuit by selectively one or both of the following steps:
  - transferring collected solar heat by the solar collector to the solar flow medium in the first circuit;
  - transferring heat from a heating gas originating from the auxiliary heat source to the solar flow medium in the solar circuit by a gas/first fluid heat exchanger, such that the solar flow medium is directly heated by the heating gas.

15. The method according to claim 14, further comprising the step of transferring heat from the heating gas originating from the heat source to the second flow medium in the second circuit by a heat exchanger which is positioned upstream of the gas/fluid heat exchanger.

16. The method according to claim 14, further comprising the step of transferring heat from the heating gas originating from the heat source to the second flow medium in the second circuit by a heat exchanger which is positioned down stream of the gas/fluid heat exchanger.

* * * * *